3,198,787
6-[(α-PHENOXY - LOWER ALKANOYL) - AMIDO]-PENICILLANIC ACID SALTS OF PROPIONYL ERYTHROMYCIN
Guy Hagemann, Nogent-sur-Marne, Lucien Penasse, Paris, and Gerard Nominé, Noisy-le-Sec, France, assignors to Roussel UCLAF, Paris, France, a corporation of France
No Drawing. Filed Jan. 23, 1962, Ser. No. 168,250
Claims priority, application France, Jan. 25, 1961, 850,721; Apr. 21, 1961, 859,498; Dec. 5, 1961, 881,001
5 Claims. (Cl. 260—239.1)

The present invention relates to 6-[(α-phenoxy-lower alkanoyl)-amido]-penicillanic acid salts of propionyl erythromycin, medicinal compositions containing the same, and processes of using the same in the treatment of infections due to staphylococci, streptococci and pneumococci.

The most numerous drawbacks which penicillin therapy has run up against are known. It is well known that many microbiological strains first inhibited by penicillin have acquired a resistance with regard to this antibiotic. For example, penicillin therapy is no longer efficient in the treatment of numerous cases of staphylococci infections. It is important to find new antibiotics presenting an antibacterial spectra of the same type as that of penicillin but with regard to which a resistance of bacterial strains and particularly of staphylococci strains is not manifest.

It is an object of the present invention to develop an antibiotic method of treatment of infections caused by staphylococci which are resistant to known antibiotics.

It is a further object of this invention to develop an antibiotic composition useful in the treatment of infections caused by bacteria which are resistant to known antibiotics.

Another object of the invention is the development of 6-[(α-phenoxy-lower alkanoyl)-amido]-penicillanic acid salts of propionyl erythromycin which are synergistically effective against infections caused by staphylococci, streptococci and penumococci.

These and other objects of the invention will become more apparent as the description thereof proceeds.

We have found that said acid addition salts of a 6-[(α-phenoxy-lower alkanoyl)-amido]-penicillanic acid (acid form) with the propionic acid ester of erythromycin (basic form) are active with regard to microbiological strains resistant to penicillin and to erythromycin. The new antibiotics profit from the synergism observed for physical mixtures of penicillin and erythromycin. The said synergism manifests itself in a most marked fashion in the case of the acid addition salts described above. These new antibiotics have the formula

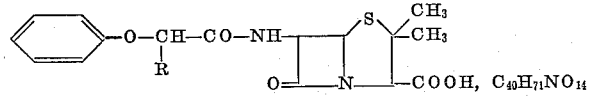, $C_{40}H_{71}NO_{14}$ in which R is selected from the group consisting of hydrogen and lower alkyl. $C_{40}H_{71}NO_{14}$ represents the empirical formula for propionyl erythromycin as described in U.S.P. 3,013,942.

The nomenclature employed in this application is that utilized in the textbook, "The Chemistry of Penicillins," wherein the term "Penicillanic acid" is utilized to designate the structure

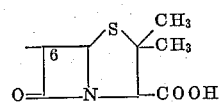

The penicillin molecule can also be named according to the rules of nomenclature of the I.U.P.A.C. The basic name for the structures of the type

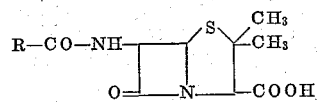

being 3,3-dimethyl - 6 - acylamino-7-oxo-4-thia-1-aza-bicyclo-[-3,2,0]-heptane-2-carboxylic acid.

The new salts present, with reference to a simple physical mixture of 6-[(α-phenoxy-lower alkanoyl)-amido]-penicillanic acid or alkali metal salts thereof and propionyl erythromycin, the following advantages:

(1) The best dosage of the two antibiotics. Since the respective quantities are equimolecular from this fact, they realize a constant synergism.

(2) The product is perfectly defined and allows a basic control on very strict terms.

(3) The very weak solubility in water of the 6-[(α-phenoxy-lower alkanoyl)-amido]-penicillanic acid salts of propionyl erythromycin favors a slow absorption of the active antibiotic and allows the obtention of high and long lasting blood concentrations and because of this the antibiotic can be taken orally at spaced intervals. The new derivatives present, in addition, good stability in gastro-intestinal media.

The 6-[(α-phenoxy-acetyl)-amido]-penicillanate salt of propionyl erythromycin (R=H) occurs in the form of a solid, colorless compound, crystallized in needles, soluble in acetone, very slightly soluble in water. Its specific rotation is $[\alpha]_D^{20}=-8.5°$ (c.=1% in acetone).

The 6[(α - phenoxy-propionyl)-amido]-penicillanate salt of propionyl erythromycin (R=CH₃) occurs in the form of a solid, colorless compound crystallized in needles, very soluble in acetone and insoluble in water. Its melting point determined on the Maquenne block is 138° C. Its specific rotation at 20° is $[\alpha]_D^{20}=-24°$ (c.=1% in acetone).

The 6-[(α-phenoxy-butyryl)-amido]-penicillanate salt of propionyl erythromycin (R=CH₃CH₂) occurs in the form of a solid, colorlesss compound crystallized in needles, very soluble in alcohol and acetone, insoluble in water. Its melting point determined on the Maquenne block is 138° C. Its specific rotation at 20° is $$[\alpha]_{D20}=-21°$$

(c.=1% in acetone).

The 6 - [(α-phenoxy-pentanoyl)-amido]-penicillanate salt of propionyl erythromycin (R=CH₃CH₂CH₂) occurs in the form of a crystalline, colorless solid, soluble in alcohol and acetone, insoluble in water. Its melting point determined on the Maquenne block is 127° C. and its specific rotation is $[\alpha]_D^{20}=-13.75°$ (c.=1% in acetone).

The process of obtaining the 6-[(α-phenoxy-lower alkanoyl)-amido]-penicillanic acid salts of propionyl erythromycin consists in essentially causing the particular 6-[(α-phenoxy-lower alkanoyl)-amido]-penicillanic acid, in its acid form or in the form of one of its alkali metal salts, to react in an appropriate solvent with propionyl erythromycin or one of its salts. After crystallization and vacuum filtering or centrifuging, the desired product is obtained, which is washed and dried.

According to a preferred mode of operation, the free acid of the 6-[(α-phenoxy-lower alkanoyl)-amido]-penicillanic acid is liberated by treating a salt of the 6-[(α-phenoxy-lower alkanoyl)-amido]-penicillanic acid in solution in water with a strong mineral acid such as sulfuric acid, to a pH of about 2. The free acid of the 6-[(α-phenoxy-lower alkanoyl)-amido]-penicillanic acid is extracted from the aqueous acidic solution with a water-immiscible organic solvent such as methylene chloride. Evaporation of the solvent gives the desired free acid.

The free acid of 6-[(α-phenoxy-lower alkanoyl)-amido]-penicillanic acid is dissolved in an inert, water-miscible organic solvent, such as acetone, and the stoichiometric amount of propionyl erythromycin is added thereto. Addition of water causes the acid addition salt of the 6-[(α-phenoxy-lower alkanoyl)-amido]-penicillanic acid and propionyl erythromycin to crystallize. The product is vacuum filtered after crystallization, washed with water and dried under vacuum.

The following examples are given as illustrative of the invention. They are not, however, to be construed as limitations on the invention.

EXAMPLE I.—PREPARATION OF THE 6-[(α-PHENOXY - ACETYL) - AMIDO] - PENICILLANATE SALT OF PROPIONYL ERYTHROMYCIN (R=H)

0.35 gm. of 6-[(α-phenoxy-acetyl)-amido]-penicillanic acid and 0.79 gm. of propionyl erythromycin were placed in suspension in 3 cc. of acetone. 15 cc. of water were added thereto. The mixture was allowed to stand for a period of 30 minutes, then vacuum filtered, washed with water and dried under vacuum in order to obtain 0.86 gm. (75%) of the 6-[(α-phenoxy-acetyl)-amido]-penicillanate salt of propionyl erythromycin. The product, which is new, occurs in the form of solid, colorless crystalline needles and is soluble in acetone and less than 0.5 part per thousand in water. It has a specific rotation $[\alpha]_D^{20} = -8.5°$ (c.=1% in acetone).

Analysis.—$C_{56}H_{89}N_3O_{19}S$; molecular weight=1140.36: Calculated—C, 58.97%; H, 7.86%; N, 3.68%; S, 2.81%. Found—C, 59.0%; H, 7.9%; N, 3.6%; S, 2.6–2.7%.

The product contains about 31% 6-[(α-phenoxyacetyl)-amido]-penicillanic acid and 69% propionyl erythromycin by weight.

EXAMPLE II.—PREPARATION OF THE 6-[(α-PHENOXY - PROPIONYL) - AMIDO] - PENICILLANATE SALT OF PROPIONYL ERYTHROMYCIN (R=CH₃)

2.82 gm. of 6-[(α-phenoxy-propionyl)-amido]-penicillanic acid and 6.12 gm. of propionyl erythromycin were placed in solution in 20 cc. of acetone. 80 cc. of water was added thereto. The mixture was allowed to stand at +5° C. for a period of 2 hours, filtered, washed with water and dried under vacuum in order to obtain 6.16 gm. (70%) of the 6-[(α-phenoxy-propionyl)-amino]-penicillanate salt of propionyl erythromycin. The colorless product, which occurs as finely crystallized needles, is soluble in acetone and insoluble in water. It has a melting point of 138° C. (Maquenne block) and a specific rotation $[\alpha]_D^{20} = -24°$ (c.=1% in acetone).

Analysis.—$C_{57}H_{91}N_3O_{19}S$; molecular weight=1154.38: Calculated—C, 59.30%; H, 7.94%; N, 3.64%; S, 2.78%. Found—C, 59.1%; H, 8.1%; N, 3.5%; S, 3.1%.

The product contains about 31.7% 6-[(α-phenoxy-propionyl)-amido]-penicillanic acid and 68.3% propionyl erythromycin by weight.

EXAMPLE III.—PREPARATION OF THE 6-[(α-PHENOXY - BUTYRYL) - AMIDO]-PENICILLANATE SALT OF PROPIONYL ERYTHROMYCIN (R=CH₃CH₂)

(a) Liberation of 6-[(α-phenoxy-butyryl)-amido]-penicillanic acid.—2.46 gm. of potassium 6-[(α-phenoxy-butyrl)-amido]-pencillanate were dissolved in 50 cc. of water. The solution was brought to a pH of 2 by the addition of a normal solution of sulfuric acid. This acidic solution was extracted three times with methylene chloride. The methylene chloride phases were decanted, washed with water, dried, then evaporated to dryness. 2.04 gm. of the desired compound were obtained, being a yield of 92%.

(b) Salt formation with propionyl erythromycin.—The residue from the above step was redissolved in 20 cc. of acetone, and 4.28 gm. of propionyl erythromycin were added thereto. The solution was filtered; then 80 cc. of water were added slowly thereto. The 6-[(α-phenoxy-butyryl)-amido]-penicillanate salt of propionyl erythromycin separated rapidly in the form of a crystalline precipitate. The mixture was allowed to stand in the refrigerator overnight. The precipitate was separated by filtration, vacuum filtered, washed three times with water and then dried.

4.9 gm. of 6-[(α-phenoxy-butyryl)-amido]-penicillanate salt of propionyl erythromycin were obtained, being a yield of 78%.

This compound, which is new, occurs in the form of colorless needles, insoluble in water, very soluble in acetone and soluble in alcohol. Its melting point, determined on the Maquenne block, is 138° C., and its specific rotation $[\alpha]_D^{20} = -21°$ (c.=1% in acetone).

Analysis.—$C_{58}H_{93}N_3O_{19}S$; molecular weight=1168.41: Calculated—C, 59.61%; H, 8.02%; N, 3.59%; S, 2.74%. Found—C, 59.3%; H, 8.1%; N, 3.6%; S, 2.4–2.6%.

The product contains about 32.5% 6-[(α-phenoxy-butyryl)-amido]-penicillanic acid and 67.5% propionyl erythromycin by weight.

EXAMPLE IV.—PREPARATION OF 6-[(α-PHENOXY-PENTANOYL) - AMIDO]-PENICILLANATE SALT OF PROPIONYL ERYTHROMYCIN (R=CH₃CH₂CH₂)

2 gm. of sodium 6-[(α-phenoxy-pentanoyl)-amido]-penicillanate were dissolved in 10 cc. of water and acidified with 5 cc. of 1 N sulfuric acid. The mixture was extracted several times with methylene chloride. The extracts were combined, washed with water, and evaporated to dryness. The residue was taken up in acetone. 3.73 gm. of propionyl erythromycin were added to the solution. The solution was added slowly to water and allowed to stand for crystallization for a period of about 30 minutes. The crystals obtained were vacuum filtered, washed with water, and dried under vacuum. 3.42 gm. of 6-[(α-phenoxy-pentanoyl)-amido]-pencillanate salt of propionyl erythromycin were obtained which could be purified by recrystallization from aqueous acetone. The purified product had a melting point of 127° C. and a specific rotation $[\alpha]_D^{20} = -13.75°$ (c.=1% in acetone). It occurred in the form of a colorless, crystalline solid, soluble in alcohol and acetone, and insoluble in water.

Analysis.—$C_{59}H_{95}N_3O_{19}S$; molecular weight=1182.44: Calculated—C, 59.92%; H, 8.09%; N, 3.55%; S, 2.71%. Found—C, 60.1%; H, 8.0%; N, 3.9%; S, 2.9%.

This compound is not described in the literature.

The product contains about 33% 6-[(α-phenoxy-pentanoyl)-amido]-penicillanic acid and 67% propionyl erythromycin by weight.

As indicated above, the 6-[(α-phenoxy-lower alkanoyl)-amido]-penicillanic acid salts of propionyl erythromycin possess a remarkable antibiotic and bactericidal action, particularly marked on staphylococci. Their action occurs in vitro and above all in vivo primarily on strains resistant to either penicillin or erythromycin, or to the two antibiotics simultaneously.

These acid addition salts show in addition a very clear synergistic effect. The activity of the salt obtained is more marked than that of each of the antibiotics taken singly. These water-insoluble acid addition salts present finally the very important advantage of having an elevated activity when administered orally.

The 6-[(α-phenoxy-lower alkanoyl)-amido]-pencillanic acid salts of propionyl erythromycin can be used for the treatment of staphylococci infections such as septicemia caused by staphylococci, staphylococcus infections of the facial skin, cutaneous staphylococci infections, pulmonary abscesses caused by staphylococci, pneumo-pulmonary suppurations, abdominal suppurations, acute pericarditis, abscesses of the kidney, suppurated otitis, mastoiditis, open fractures and, in general, during surgical intervention upon septic focuses.

The 6-[(α-phenoxy-lower alkanoyl)-amido]-penicillanic acid salts of propionyl erythromycin are used by all methods of administration. They can be administered by transcutaneous methods, by local methods of topical application on the skin and mucous membranes or by rectal methods, in the form of intramuscular injections or subcutaneous injections, intravenously, intra-urethrally, by instillations, by intracavitary dressings, by localized contacts, and by applications.

They can be used in the form of injectable suspensions, prepared in ampules or multiple-dose flacons, in the form of tablets, aromaticized powders, granules, emulsions, in the form of suppositories, ovules, intravaginal tablets, pomades, dermic salves, ophthalmic salves, nasal salves and topical powders in pulverizations.

The pharmaceutical compositions, such as injectable suspensions, granules, aromaticized powders, suppositories, ovules, salves, topical powders, are prepared according to the usual processes.

The dosage of the compositions will vary with respect to the infection and the method of application as is well known in the antibiotic art.

EXAMPLE V.—PHARMACOLOGICAL STUDIES OF 6 - [(α-PHENOXY-LOWER-ALKANOYL)-AMIDO]-PENICILLANIC ACID SALTS OF PROPIONYL ERYTHROMYCIN (1) *Determination in vitro of the synergism of 6-[(α-phenoxy-lower alkanoyl) - amido] - penicillanic acid salts of propionyl erythromycin toward clinical strains of staphylococci.*—The tests were made on an Oxoid No. 2 media with strains sensitive to erythromycin and slightly sensitive to penicillin G (Strains BEN and No. 6699), and with strains resistant to erythromycin and slightly sensitive or resistant to penicillin G (Strains Nos. 2014, 298 and 11051).

The readings were made after 24 and 40 hours of incubation.

*Table I*

(a) 6-[(α-PHENOXY-ACETYL)-AMIDO]-PENICILLANATE SALT OF PROPIONYL ERYTHROMYCIN

| Strains | Minimum Inhibiting Concentration in μg./cc. | | | | | | | | | |
|---|---|---|---|---|---|---|---|---|---|---|
| | BEN | | 6699 | | 2014 | | 298 | | 11051 | |
| | 24 Hrs. | 40 Hrs. | 24 Hrs. | 40 Hrs. | 24 Hrs. | 40 Hrs. | 24 Hrs. | 40 Hrs. | 24 Hrs. | 40 Hrs. |
| 6-[(α-phenoxyacetyl)-amido]-penicillanic acid (Penicillin V) | 1 | 15 | 2 | 7 | 3 | 10 | 0.5 | 2 | 1 | 5 |
| Erythromycin | 0.015 | 0.015 | 0.05 | 0.05 | >1,000 | >1,000 | >1,000 | >1,000 | >1,000 | >1,000 |
| 6-[(α-phenoxyacetyl)-amido]-penicillanate salt of propionyl erythromycing | ≤0.1 | ≤0.1 | ≤0.1 | ≤0.1 | 3 | 20 | 0.2 | 0.2 | ≤0.1 | ≤0.2 |

(b) 6-[(α-PHENOXY-PROPIONYL)-AMIDO]-PENICILLANATE SALT OF PROPIONYL ERYTHROMYCIN

| Strains | Minimum Inhibiting Concentration in μg./cc. | | | | | | | | | |
|---|---|---|---|---|---|---|---|---|---|---|
| | BEN | | 6699 | | 2014 | | 298 | | 11051 | |
| | 24 Hrs. | 40 Hrs. | 24 Hrs. | 40 Hrs. | 24 Hrs. | 40 Hrs. | 24 Hrs. | 40 Hrs. | 24 Hrs. | 40 Hrs. |
| 6-[(α-phenoxypropionyl)-amido]-penicillanic acid | 1 | 1 | 0.5 | 0.5 | 0.5 | 1 | 0.5 | 0.5 | 0.02 | 0.05 |
| Erythromycin | 0.015 | 0.015 | 0.05 | 0.05 | >1,000 | >1,000 | >1,000 | >1,000 | >1,000 | >1,000 |
| 6-[(-phenoxypropionyl)-amido]-penicillanate salt of propionyl erythromycin | ≤0.1 | ≤0.1 | ≤0.1 | ≤0.1 | 5 | 5-20 | 0.5 | 1 | 0.5 | 1 |

(c) 6-[(α-PHENOXY-BUTYRYL)-AMIDO]-PENICILLANATE SALT OF PROPIONYL ERYTHROMYCIN

[Tests on Clinical Strains of Pathogenic Staphylococci Resistant to Penicillin G or to Erythromycin]

| Strains | Minimum Inhibiting Concentration in μg./cc. | | | | | | | | | |
|---|---|---|---|---|---|---|---|---|---|---|
| | OXFORD | | 5215 | 10375 | 10864 | 10906 | 11042 | BEN | | 6699 | |
| | 24 Hrs. | 40 Hrs. | 24 Hrs. | 24 Hrs. | 24 Hrs. | 24 Hrs. | 24 Hrs. | 24 Hrs. | 40 Hrs. | 24 Hrs. | 40 Hrs. |
| 6-[(α-phenoxybutyryl)-amido]-penicillanic acid | 0.015 | 0.015 | 0.03 | 0.03 | 0.02 | 0.03 | 0.05 | 0.2 | 0.5 | 0.5 | 0.5 |
| Erythromycin | 0.05 | 0.05 | 0.1 | 0.03 | 0.15 | 1 | 0.15 | 0.015 | 0.015 | 0.05 | 0.05 |
| 6-[(α-phenoxybutyryl)-amido]-penicillanate salt of propionyl erythromycin | 0.04 | 0.04 | 0.05 | 0.03 | 0.03 | 0.05 | 0.05 | ≤0.1 | ≤0.1 | ≤0.1 | ≤0.1 |

Strains sensitive to penicillin G | Strains slightly sensitive or resistant to penicillin G

| Strains | Minimum Inhibiting Concentration in μg./cc. | | | | | | | | | |
|---|---|---|---|---|---|---|---|---|---|---|
| | 2014 | | 10471 | | 10800 | | 27 | | 108 | |
| | 24 Hrs. | 40 Hrs. | 24 Hrs. | 40 Hrs. | 24 Hrs. | 40 Hrs. | 24 Hrs. | 40 Hrs. | 24 Hrs. | 40 Hrs. |
| 6-[(α-phenoxybutyryl)-amido]-penicillanic acid | 0.5 | 1 | 1 | 4-5 | 0.5 | 0.5 | 1 | 1 | 0.5 | 1 |
| Erythromycin | >1,000 | >1,000 | >1,000 | >1,000 | >1,000 | >1,000 | >1,000 | >1,000 | >1,000 | >1,000 |
| 6-[(α-phenoxybutyryl)-amido]-penicillanate salt of propionyl erythromycin | 0.5 to 2 | 3 | 0.5 | 0.5 | 1 | 1 | 1 | 2 | 5 | 5 |

Table I—Continued

| Strains | Minimum Inhibiting Concentration in µg./cc. | | | | | | | | |
|---|---|---|---|---|---|---|---|---|---|
| | 298 | | 11051 | | 472 | 495 | 2100 | 2352 | 2644 |
| | 24 Hrs. | 40 Hrs. | 24 Hrs. | 40 Hrs. | 24 Hrs. | 24 Hrs. | 24 Hrs. | 24 Hrs. | 24 Hrs. |
| 6-[(α-phenoxybutyryl)-amido]-penicillanic acid | 0.2 | 0.2 | 0.5 | 0.5 | 0.5 | 0.5 | 0.2 | 0.2 | 0.2 |
| Erythromycin | >1,000 | >1,000 | >1,000 | >1,000 | >1,000 | >1,000 | >1,000 | >1,000 | >1,000 |
| 6-[(α-phenoxybutyryl)-amido]-penicillanate salt of propionyl erythromycin | 1 | 1 | 0.5 | 0.5 | 2 | 5 | 5 | 0.2 | 0.5 |

(d) *6 -[(α - phenoxy-pentanoyl)-amido]-penicillanic acid salt of propionyl erythromycin.*—With reference to ten clinical strains of staphylococci slightly sensitive to penicillin G (inhibited by 0.5 to 10 µg./cc.) and very resistant to erythromycin (inhibited by more than 1000 µg./cc.), a very clear synergism was observed with the 6-[(α-phenoxy-pentanoyl)-amido]-penicillanic acid salt of propionyl erythromycin in the proportion of 1:1 (inhibited by 0.5 to 2 µg./cc.), and the activity of these mixtures is in general superior to that of dimethoxyphenyl penicillin (BRL 1241 or Celbenine) taken as an element for comparison.

With reference to ten clinical strains of golden hemolytic erythromycin-resistant staphylococci (inhibited by 500 to 1000 µg./cc.) and with reference to five clinical strains of golden hemolytic erythromycin-sensitive staphylococci (inhibited by 0.03 to 0.15 µg./cc.), there was also noted a clear synergism of the 6-[(α-phenoxy-pentanoyl)-amido]-penicillanic acid salt of propionyl erythromycin 1:1.

There is thus observed a marked synergistic effect in 60 to 70% of the cases with reference to strains sensitive to penicillin G and to erythromycin or resistant to the two antibiotics.

(2) *Determination in vitro of the activity of the 6-[(α-phenoxy-pentanoyl)-amido]-penicillanate salt of propionyl erythromycin with reference to various clinical strains of staphylococci and streptococci.* (A) *Staphylococci.*— The comparative determinations were made on Oxoid No. 2 media at a pH of 7.35. Readings after 24 hours of incubation at 37° C. were made. The table hereafter indicates the minimum inhibiting concentrations in µg./cc. observed for the various strains of staphylococci studied.

These results show that for the strains of staphylococci sensitive or resistant to erythromycin and/or penicillin, the 6-[(α-phenoxy-pentanoyl)-amido]-penicillanate salt of propionyl erythromycin which contains about 33% of 6 - [(α-phenoxy-pentanoyl)-amido]-penicillanic acid and 67% of propionyl erythromycin is systematically synergistic since the minimum inhibiting concentrations are always less than those of the two active compounds taken separately.

Additionally, the comparison made with several penicillins on various strains of pathogenic staphylococcci (comprising those reputed as the most active with reference to staphylococci penicillin-resistant secretors of penicillinase) shows the superiority of action of the 6-[(α-phenoxy-pentanoyl)-amido]-penicillanate salt of propionyl erythromycin.

Table III.—*Minimum inhibiting concentrations in µg./cc.*

| Strains Number | 6-[α-phenoxypentanoyl)-amido]-penicillanate salt of propionyl erythromycin | Penicillin G | Penicillin T |
|---|---|---|---|
| 1603 | 0.02 | 1 | 1 |
| 9398 | 0.02 | 0.2 | 0.4 |
| 9399 | 0.05 | 0.4 | 0.2 |
| 9699 | 0.005 | 2 | >3 |
| 9716 | 0.002 | 0.4 | 0.4 |
| 1592 | 0.05 | >3 | >3 |
| 1594 | 0.05 | 0.4 | 0.2 |
| 1082 | 0.2 | >3 | >3 |
| 1100 | 0.2 | 0.2 | 0.2 |
| 1597 | 0.02 | 0.2 | 2 |
| 1601 | 0.2 | >3 | 2 |
| 4842 | 2 | >3 | >3 |

Legend:
Penicillin G=benzyl penicillin.
Penicillin T=p-aminobenzyl penicillin.

Table II

| Strains of staphylococci number and/or source | Erythromycin | 6-[(α-phenoxy-pentanoyl)-amido]-penicillanic acid | 6-[(α-phenoxy-pentanoyl)-amido]-penicillanate salt of propionyl erythromycin |
|---|---|---|---|
| Oxford | 0.02 | 0.05 | 0.005 |
| ATCC 6533 P | 0.005 | 0.05 | 0.002 |
| LW | 0.1 | 1 | 0.02 |
| Number 1580 | 0.05 | 0.4 | 0.05 |
| Number 8756 | 0.05 | 1 | 0.05 |
| Number 298/61 (throat smear) | 500 | 0.5 | 0.5 |
| Number 2247/60 (spittle) | 1,000 | 0.5 | 0.5 |
| Number 10375/60 (pus, leg ulceration) | 0.03 | 0.05 | 0.03 |
| Number 10864/60 (parotidienal tumor puncture) | 0.03 | 0.1 | 0.05 |
| Number 11042/60 (parotiditis pus) | 0.03 | 0.1 | 0.05 |
| Number 8433 | >1,000 | 2 | 2 |
| Number 1592 | 0.05 | 2 | 0.05 |
| Number 1594 | 0.2 | 0.2 | 0.05 |
| Number 1082 | 0.2 | 2 | 0.2 |
| Number 1100 | 0.2 | 0.4 | 0.2 |
| Number 1597 | 0.02 | 1 | 0.02 |
| Number 4842 | >3 | 2 | 2 |
| Number LW-59 (sore lip smear) | 0.2 | 0.4 | 0.1 |
| Number 1603 (nose smear) | 0.05 | 0.4 | 0.02 |
| Number 9398 (psoriasis scale) | 0.2 | 0.4 | 0.02 |
| Number 9399 (psoriasis scale) | 0.05 | 0.4 | 0.05 |
| Number 9716 (spittle) | 0.002 | 0.4 | 0.002 |

(B) *Hemolytic streptococci of group A.*—The activity in vitro of the 6-[(α-phenoxy-pentanoyl)-amido]-penicillanate salt of propionyl erythromycin was determined on the Lutz media at a pH of 6.8 to 7 (readings after 24 hours of incubation), comparative to 6-[(α-phenoxy-pentanoyl)-amido]-penicillanic acid and to three other penicillins. The table indicates the minimum inhibiting concentrations in μg./cc. observed for the various strains of streptococci studied (weakly inoculated).

For those staphylococci resistant to penicillin G, penicillin V, and 6-[(α-phenoxy-butyryl)-amido]-penicillanic acid, it was noted that the acid addition salts of the different 6-[(α-phenoxy-lower alkanoyl) - amido] - penicillanic acids with propionyl erythromycin gave a curative effect very superior to that of the active components when taken separately. This synergistic combination appears thus very useful for the treatment by oral methods of Table IV

| Streptococci (Number and source) | 6-[(α-phenoxy-pentanoyl)-amido]-penicillanate salt of propionyl erythromycin | 6-[(α-phenoxy-pentanoyl)-amido]-penicillanic acid (sodium salt) | Penicillin G | Penicillin T (p-aminobenzyl penicillin) | α-Aminobenzyl penicillin |
|---|---|---|---|---|---|
| Number 1585 (throat smear) | 0.0002 | 0.0004 | 0.00005 | 0.001 | ≤0.00002 |
| Number 1560 (throat smear) | 0.01 | 0.02 | 0.01 | 0.01 | 0.002 |
| Number 1631 (throat smear) | 0.0002 | 0.01 | 0.0002 | 0.0002 | 0.0002 |
| Number 1643 (throat smear) | 0.0002 | 0.1 | 0.004 | 0.001 | ≤0.00002 |
| Number 9154 (vaginal sample) | ≤0.00002 | 0.00005 | ≤0.00002 | 0.0004 | 0.00002 |
| Number 9155 (O.R.L. scab) | ≤0.00002 | 0.01 | 0.002 | ≤0.00002 | ≤0.00002 |

These results show that the 6-[(α-phenoxy-pentanoyl)-amido]-penicillanate salt of propionyl erythromycin, which contains only 33% of its weight of 6-[(α-phenoxy-pentanoyl)-amido]-penicillanic acid, presents an activity superior in all cases to that of 6-[(α-phenoxy-pentanoyl)-amido]-penicillanic acid and, in general, is superior to that of penicillin G, penicillin T and α-aminobenzyl penicillin.

(3) *Determination in vivo of the therapeutic efficacy in oral therapy of the 6-[(α-phenoxy-lower alkanoyl)-amido]-penicillanic acid salts of propionyl erythromycin in comparison with 6-[(α-phenoxy-lower alkanoyl)-amido]-penicillanic acid and propionyl erythromycin.*
(A) Experimental infections of staphylococci in mice.
(a) *Penicillian-resistant staphylococci.*—The compounds were administered by mouth to mice having received a massive dose of staphylococci resistant to penicillin G (Strain BEN of the Fournier Institute), causing in the controls a fatal infection. The strain was previously rendered virulent by successive and repeated passages through mice. The percentage of efficacy was determined by the reduction in mortality of the animals tested (series of 20 mice) and after determining the size of the lesions on autopsy.

staphylococci infections towards which injectable penicillin G or the oral penicillins are practically without effect.

(b) *Staphylococci penicillin-sensitive.*—In a first series of tests covering three groups of ten mice, infected by intraperitoneal injection with 0.30 cc. of a culture containing $10^{-2}$ of a staphylococci strain TIN, the animals were treated by administration orally two successive days with a daily dose of 0.5 mg. per mouse. The therapeutic effect determined on the reduction of mortality rate and size of lesions was the following:

Subtsance administered: Therapeutic effect, percent

- 6 - [(α-phenoxy-pentanoyl)-amido]-pencillanate salt of propionyl erythromycin _____ 87
- 6 - [(α-phenoxy-pentanoyl)-amido]-penicillanic acid _____ 100
- Propionyl erythromycin _____ 3

These results show the synergistic effect of the acid addition salt which contains only 33% of 6-[(α-phenoxy-pentanoyl)-amido]-penicillanic acid. The erythromycin Table V

| Products | Doses | Therapeutic Effect (percent) | | |
|---|---|---|---|---|
| | | 1st Test | 2nd Test | Average |
| Penicillin G | 20,000 U subcutaneously. | 30 | 0 | 15 |
| Penicillin V | 5 mg. orally 2 days in succession. | 10 | 0 | 5 |
| 6-[(α-phenoxy-butyryl)-amido]-penicillanic acid. | ___do___ | 40 | 0 | 20 |
| 6-[(α-phenoxy-pentanoyl)-amido]-penicillanic acid. | 3 mg. orally 2 days in succession. | (3 tests) | | 45 |
| Propionyl erythromycin | ___do___ | (3 tests) | | 43 |
| Do | 5 mg. orally 2 days in succession. | 50 | 90 | 70 |
| 6-[(α-Phenoxy-acetyl)-amido]-penicillanate salt of propionyl erythromycin. | ___do___ | 100 | 83 | 91.5 |
| 6-[(α-Phenoxy-propionyl)-amido]-penicillanate salt of propionyl erythromycin. | ___do___ | 92 | 90 | 91 |
| 6-[(α-Phenoxy-butyryl)-amido]-penicillanate salt of propionyl erythromycin. | ___do___ | 92 | 75 | 83.5 |
| 6-[(α-Phenoxy-pentanoyl)-amido]-penicillanate salt of propionyl erythromycin. | 3 mg. orally 2 days in succession. | (3 tests) | | 90 | by itself has in this case (erythromycin-resistant strain) only slight therapeutic effect.

In a second series of tests covering six groups of ten mice infected by intravenous methods with 0.2 cc. of a hemolytic golden staphylococci culture, the animals were treated by daily orally administering the doses indicated below for a period of 10 consecutive days, the percentage of mortality observed being the following:

| Compound administered | Dose per mouse per day, mg. | Percent mortality |
|---|---|---|
| Control series | None | 60 |
| Propionyl erythromycin | 2 | 20 |
| Do | 3 | 0 |
| 6-[(α-phenoxy-pentanoyl)amido]-penicillanic acid | 2 | 20 |
| 6-[(α-phenoxy-pentanoyl)amido]-penicillanate salt of propionyl erythromycin | 2 | 0 |
| Do | 3 | 0 |

Macroscopic examination of the renal lesions showed, in addition, for the series treated with 3 mg. daily of the 6 - [(α - phenoxy - pentanoyl) - amido] - penicillanate salt of propionyl erythromycin, an excellent therapeutic effect (complete absence of lesions), whereas the control animals all presented large lesions and the animals of the other series also presented several lesions (20% of the mice). This test showed, thus, a very clear synergistic effect of the 6-[(α-phenoxy-pentanoyl)-amido]-penicillanate salt of propionyl erythromycin.

(B) *Experimental infections caused by streptococci and pneumococci.*—The following results were obtained on a series of 10 mice by administering orally for two days in succession the compared substances:

(a) *Hemolytic streptococci group A (Strain A–561)*

Compound administered     Therapeutic effect
3 mg. per mouse per day:    (average of 3 tests), percent
   6-[(α-phenoxy-pentanoyl) - amido]penicillanate
     salt of propionyl erythromycin _____ 88
   6 - [(α - phenoxy - pentanoyl) - amido] - penicillanic acid _____ 96
   Propionyl erythromycin _____ 66

(b) *Pneumococci II*

Compound administered
3 mg. per mouse per day:    Therapeutic effect, percent
   6 - [(α - phenoxy - pentanoyl) - amido]-penicillanate salt of propionyl erythromycin _____ 100
   6 - [(α - phenoxy - pentanoyl) - amido]-penicillanic acid _____ 90
   Propionyl erythromycin _____ 23

These tests showed that the 6-[(α-phenoxy-pentanoyl)-amido]-penicillanate salt of propionyl erythromycin is equally synergistic with reference to infections of streptococci and pneumococci.

From a comparison of the above in vivo tests, it can be seen that the clinical dosage of the 6-[(α-phenoxy-lower alkanoyl)-amido]-penicillanic acid salts of propionyl erythromycin are less than the known dosages of 6-[(α-phenoxy-lower alkanoyl)-amido]-penicillanic acid and propionyl erythromycin.

It is obvious that many changes may be made in the various specific embodiments presented above without modifying the invention or departing from the scope of the appended claims.

We claim:

1. The acid addition salt of a 6-[(α-phenoxy-lower alkanoyl)-amido]-penicillanic acid and the propionic acid ester of erythromycin, said 6-[(α-phenoxy-lower alkanoyl)-amido]-penicillanic acid having the formula

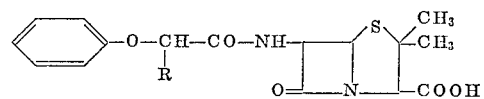

wherein R is selected from the group consisting of hydrogen and lower alkyl.

2. The acid addition salt of 6-[(phenoxy-acetyl)-amido]-penicillanic acid and the propionic acid ester of erythromycin.

3. The acid addition salt of 6-[(α-phenoxy-propionyl)-amido]-penicillanic acid and the propionic acid ester of erythromycin.

4. The acid addition salt of 6-[(α-phenoxy-butyryl)-amido]-penicillanic acid and the propionic acid ester of erythromycin.

5. The acid addition salt of 6-[(α-phenoxy-pentanoyl)-amido]-penicillanic acid and the propionic acid ester of erythromycin.

References Cited by the Examiner

UNITED STATES PATENTS

| 2,743,268 | 4/56 | Stieff | 260—239.1 |
| 2,985,648 | 5/61 | Doyle et al. | 260—239.1 |
| 3,013,942 | 12/61 | Celmer | 260—239.1 |
| 3,062,718 | 11/62 | Spiegel | 167—65 |
| 3,100,177 | 8/63 | Wheeler | 167—65 |
| 3,109,773 | 11/63 | Mercer et al. | 260—239.1 |

OTHER REFERENCES

Goldberg, Antibiotics, Their Chemistry and Non-Medical Uses, published by D. Van Nostrand Co., Inc., Princeton, New Jersey, pp. 59–66, 101–107, 174–179, 322–323, 449–453 (1959).

Gourevitch et al., Antibiotics and Chemotherapy, vol. 10, pages 121–128 (1960).

Nickel et al., Chemical Abstracts, vol. 48; pp. 5425–5426 (1954). (Abstracting J. Agr. Food Chem., 2, 178–82 (1954).)

NICHOLAS S. RIZZO, *Primary Examiner.*